United States Patent [19]

Manwiller

[11] 4,360,626

[45] Nov. 23, 1982

[54] OXIDATIVELY STABLE POLYIMIDE COMPOSITIONS

[75] Inventor: Carl H. Manwiller, Wilmington, Del.

[73] Assignee: E. I. Du Pont de Nemours and Company, Wilmington, Del.

[21] Appl. No.: 257,109

[22] Filed: Apr. 24, 1981

[51] Int. Cl.$^3$ ............................................. C08L 79/08
[52] U.S. Cl. ........................................ 524/495; 524/600
[58] Field of Search ..................... 260/37 N; 252/511; 524/600, 602, 495, 496

[56] References Cited

U.S. PATENT DOCUMENTS

| | | | |
|---|---|---|---|
| 3,179,614 | 4/1965 | Edwards | 260/30.2 |
| 3,179,631 | 4/1965 | Endrey | 260/78 |
| 3,385,684 | 5/1968 | Voter | 51/298 |
| 3,391,120 | 7/1968 | Fritz | 260/63 |
| 3,448,068 | 6/1969 | Holub et al. | 260/29.2 |
| 3,666,528 | 5/1972 | Barnhardt | 117/49 |

*Primary Examiner*—Lewis T. Jacobs

[57] ABSTRACT

Graphite-filled polyimide compositions of excellent high temperature stability obtained through use of graphite having low reactive impurity content.

3 Claims, No Drawings

OXIDATIVELY STABLE POLYIMIDE COMPOSITIONS

BACKGROUND OF THE INVENTION

Polyimides, such as those prepared according to Edwards, U.S. Pat. No. 3,179,614, are useful in a wide variety of commercial applications. The outstanding performance characteristics of these polymers under stress and at high temperatures have made them useful in the form of bushings, seals, electrical insulators, compressor vanes and impellers, pistons and piston rings, gears, thread guides, cams, brake linings, and clutch faces. While basically non-melt fabricable, these polyimide resins can be molded into the desired final shape by specialized fabrication techniques.

It is often desirable to incorporate fillers in such polyimide compositions before fabrication into their final form. For example, the admixture of graphite in a polyimide intended for a bearing surface gives a lubricating effect which improves the wear characteristics of the final product. The graphite is typically incorporated in the course of preparation of the polyimide by precipitation of the polyimide resin on the graphite particles.

While the addition of graphite to polyimides has contributed significantly to the wear characteristics of the final polyimide product, incorporation of graphite also has generally resulted in a depreciation of physical properties under prolonged exposure to high temperatures. Specifically, the polyimide exhibits an undesirable weight loss, shrinkage, and loss of tensile strength and elongation.

SUMMARY OF THE INVENTION

The present invention provides a graphite-filled polyimide composition which exhibits improved physical properties when subjected to higher temperatures for extended periods of time.

Specifically, the instant invention provides, in a non-melt fabricable polyimide composition containing about from 5 to 75 volume percent graphite, the improvement wherein the graphite contains less than about 0.15 weight percent of at least one reactive impurity selected from the group consisting of ferric sulfide, barium sulfide, calcium sulfide, copper sulfide, barium oxide, calcium oxide and copper oxide.

DETAILED DESCRIPTION OF THE INVENTION

The present invention is applicable to those polyimide compositions described, for example, in U.S. Pat. Nos. 3,179,614 and 3,179,631, both hereby incorporated by reference. Graphite, commercially available in a wide variety of forms as a fine powder, is typically admixed with a polymer solution before precipitation of the polyimide. The particle size of the graphite can vary widely, but is generally in the range of about from 5 to 75 microns. Preferably, for particularly good oxidative stability, the average particle size is about from 5 to 25 microns. The total concentration of the graphite introduced into the resin varies, of course, with the final wear properties desired and the particular end use application. However, in general, the graphite concentration is about from 5 to 75 percent by volume.

The present invention is based on the discovery that the depreciation of physical properties on high temperature aging previously encountered was due to the presence of reactive impurities in the graphite that had an adverse effect on the oxidative stability of the final polymeric blend. Specifically, it has been found that markedly improved physical properties can be obtained using graphite having less than about 0.15 weight percent reactive impurities, and preferably less than about 0.10 weight percent. Particularly deleterious reactive impurities include iron sulfide and the oxides and sulfides of barium, calcium, and copper.

The level of total inorganic impurities can be measured as the weight of ash residue of pyrolyzed graphite. The presence and quantity of reactive or catalytically active impurities can be determined by emission spectroscopy or X-ray fluorescence. In general, the reactive impurities in graphite constitute about one-half of the total inorganic impurities.

The unusually pure graphite used in accordance with the instant invention can be either naturally occurring graphite or synthetic graphite. Natural graphite generally has a wide range of impurity concentrations, while synthetically produced graphite is commercially available having low reactive impurity concentrations. Graphite containing an unacceptably high concentration of impurities can be purified by chemical treatment with a mineral acid. For example, treatment of the impure graphite with sulfuric, nitric or hydrochloric acid at elevated or reflux temperatures can be used to reduce the impurities to an acceptable level. Alternatively, commercial graphite compositions are available that typically satisfy the purity levels required in the instant invention, such as "Dixon Airspun KS-5" commercially available from The Joseph Dixon Crucible Co.

The compositions made in accordance with the present invention exhibit improved physical properties after exposure to elevated temperatures of 200° to 400° C., both at atmospheric and elevated pressures. The improved properties include markedly reduced weight loss and shrinkage and significantly higher tensile strength and elongation at break after high temperature aging than are found using conventional graphite fillers. These improved physical properties permit the use of the present polyimide compositions in a variety of high temperature applications, such as aircraft jet engines, in which outstanding, long-term, high temperature performance is required.

The present invention is further illustrated by the following specific examples.

In each of the examples, polyimide resins were prepared from pyromellitic dianhydride and 4,4'-oxydianiline according to the procedures of U.S. Pat. No. 3,179,614. The indicated quantities of graphite powder were incorporated into the polymer solution prior to precipitation. The resulting filled resin powder was then converted into standard ASTM-E8 tensile bars having a nominal thickness of 0.10" by direct forming at a pressure of 100,000 psi. The resulting molded test bars were sintered for three hours at 400° C. under nitrogen at atmospheric pressure. After cooling to room temperature, the test bars were marked for identification, weighed and measured in width and thickness.

The tensile bars were tested for high temperature oxidative stability by treating at 360° C., either at atmospheric pressure or elevated pressures of 70 psia.

The total inorganic impurity concentration of the graphite was measured by burning the graphite at atmospheric pressure at a temperature of 600°–700° C. and weighing the inorganic ash residue.

The tensile bars were tested for tensile strength and elongation according to ASTM-E-8.

EXAMPLES 1 TO 2 AND COMPARATIVE EXAMPLES A TO C

In Examples 1 and 2, tensile bars were prepared using a commercial polyimide resin prepared from pyromellitic dianhydride and 4,4'-oxydianiline combined with 10 and 25 volume percent of Dixon KS-5 graphite having less than 0.15 weight percent total inorganic impurities, about half of which are reactive impurities. In Comparative Examples A to C, tensile bars were prepared from the same resin using 0, 10 and 27 volume percent of Dixon 200-09 graphite containing about 2 percent total inorganic impurities. The test bars were heated at 360° C. with one atmosphere of flowing air (1.5 liters/min) for a period of 120 hours. The tensile bars were tested before and after heat treatment and the results are summarized in Table I.

TABLE I

| Example | Vol % Graphite | TS, MPa/E, % Initial | After 120 hrs | % Wt Loss | % Shrinkage |
|---|---|---|---|---|---|
| 1 | 10 | 81.4/10.0 | 57.2/2.8 | 1.16 | 0.73 |
| 2 | 25 | 69.2/5.3 | 56.5/2.6 | 0.85 | 0.36 |
| A | 0 | 74.5/8.0 | 38.5/1.9 | 1.55 | 0.46 |
| B | 10 | 66.3/7.1 | 36.4/1.7 | 5.58 | 1.13 |
| C | 27 | 51.2/3.6 | 30.8/1.4 | 9.56 | 1.96 |

EXAMPLES 3 & 4 AND COMPARATIVE EXAMPLES D, E, & F

The procedure of Examples 1 and 2 and Comparative Examples A to C was repeated, except that the testing was carried out at a pressure of 70 psia in air and the tensile bars were heated for 100 hours instead of 120 hours. The tensile bars were tested before and after heat treatment and the results are summarized in Table II.

TABLE II

| Example | Vol % Graphite | TS, MPa/E, % Initial | After 100 hrs | % Wt Loss | % Shrinkage |
|---|---|---|---|---|---|
| 3 | 10 | 81.3/16.0 | 45.2/1.7 | 3.01 | 0.60 |
| 4 | 25 | 69.2/5.3 | 45.4/1.6 | 1.96 | 0.10 |
| D | 0 | 74.5/8.0 | 24.1/0.8 | 3.73 | 0.50 |
| E | 10 | 66.3/7.1 | 23.1/0.8 | 13.41 | 0.64 |
| F | 27 | 51.2/3.6 | 14.2/0.4 | 20.00 | 0.68 |

EXAMPLES 5 to 8 AND COMPARATIVE EXAMPLES G & H

The procedure of Example 2 was repeated, using Dixon Airspun KS-5 synthetic graphite in all examples. The percentage of total inorganic impurities in the graphite varied as summarized in Table III. The tensile bars were treated for 200 hours at 360° C. and the bars tested before and after heat treatment. The test results are also summarized in Table III.

TABLE III

| Example | Vol % Graphite | Graphite % Ash | TS, MPa/E, % Initial | After 200 hrs | % Wt Loss | % Shrinkage |
|---|---|---|---|---|---|---|
| 5 | 25 | 0.12 | 59.3/3.3 | 42.2/2.1 | 3.5 | 1.12 |
| 6 | " | 0.12 | 57.9/3.4 | 45.0/2.2 | 3.4 | 0.76 |
| 7 | " | 0.12 | 60.1/3.8 | 43.1/2.3 | 3.8 | 0.76 |
| 8 | " | 0.12 | 58.6/3.5 | 40.0/2.1 | 3.7 | 0.72 |
| G | " | 0.96 | 60.7/3.2 | 28.5/1.2 | 21.6 | 3.50 |
| H | " | 0.24 | 58.2/3.6 | 29.4/1.2 | 11.6 | 1.68 |

EXAMPLES 9 to 15

The procedure of Examples 1 and 2 was repeated, except that the tensile bars were tested for 200 hours, and the total inorganic impurity content of the graphite varied from 0.13 percent to 0.044 percent. The test results are summarized in Table IV.

TABLE IV

| Example | Vol % Graphite | Graphite % Ash | TS, MPa/E, % Initial | After 200 hrs | % Wt Loss | % Shrinkage |
|---|---|---|---|---|---|---|
| 9 | 25 | 0.130 | 68.9/3.9 | 44.7/1.6 | 2.63 | 0.63 |
| 10 | 25 | 0.080 | 58.0/3.6 | 40.6/1.4 | 1.81 | 0.40 |
| 11 | 25 | 0.046 | 60.6/4.9 | 42.2/1.6 | 1.70 | 0.45 |
| 12 | 25 | 0.044 | 64.3/4.0 | 44.7/1.3 | 1.37 | 0.31 |
| 13 | 10 | 0.046 | 77.2/8.6 | 41.6/1.9 | 2.00 | 0.63 |
| 14 | 10 | 0.081 | 72.7/6.5 | 38.2/1.8 | 1.96 | 0.63 |
| 15 | 10 | 0.044 | 76.3/9.7 | 41.2/1.9 | 1.66 | 0.50 |

The test results indicate no significant effect on the oxidative stability of the molded compositions with a variation in total inorganic impurity content within the range of about from 0.04 to 0.13.

EXAMPLES 16 TO 18 AND COMPARATIVE EXAMPLE I

The procedure of Examples 5 to 8 and Comparative Examples G and H was repeated. In Comparative Example I, a graphite was used which contained an unacceptably high level of impurities. In Examples 16 to 18, the same graphite was treated with acids to remove impurities. The treatment was carried out at temperatures of 80° to 100° C. with six normal acid concentrations for a period of two hours. The results are summarized in Table V.

TABLE V

| Example | Acid Treatment | Graphite Wt % Ash | TS, MPa/E, % Initial | After 200 hrs | % Wt Loss | % Shrink |
|---|---|---|---|---|---|---|
| I | None | 2.52 | 55.60/4.2 | 31.3/1.5 | 12.2 | 1.6 |
| 16 | HCl | 1.74 | 68.9/4.1 | 54.7/1.8 | 1.8 | 0.4 |
| 17 | $H_2SO_4$ | 1.87 | 68.2/3.6 | 46.7/1.3 | 1.8 | 0.4 |
| 18 | HCl—$HNO_3$ | 1.63 | 70.0/4.8 | 49.7/2.2 | 1.3 | 0.3 |

EXAMPLES 19 TO 23

The procedure of Examples 5 to 8 was repeated, except that increased graphite concentrations were used. The results, which are summarized in Table VI, indicate that graphite loadings as high as 70 volume percent do not affect oxidative stability of the polyimide composition.

TABLE VI

| Example | Vol % Graphite | TS/E - MPa/% Original | After 200 hrs | % Wt Loss | % Shrinkage |
|---|---|---|---|---|---|
| 19 | 40 | 6.14/3.0 | 45.1/1.2 | 1.37 | 0.31 |
| 20 | 50 | 49.9/2.0 | 37.6/0.9 | 1.41 | 0.44 |
| 21 | 60 | 43.6/1.5 | 31.4/0.7 | 1.30 | 0.31 |
| 22 | 63 | 44.3/1.5 | 30.4/0.6 | 1.25 | 0.27 |

TABLE VI-continued

| Example | Vol % Graphite | TS/E - MPa/% Original | After 200 hrs | % Wt Loss | % Shrinkage |
|---|---|---|---|---|---|
| 23 | 70 | 38.5/0.8 | 26.8/0.5 | 1.49 | 0.22 |

I claim:

1. In a non-melt fabricable polyimide composition containing about from 5 to 75 volume percent graphite, the improvement wherein the graphite contains less than about 0.15 weight percent of at least one reactive impurity selected from the group consisting of ferric sulfide, barium sulfide, calcium sulfide, copper sulfide, barium oxide, calcium oxide, and copper oxide.

2. The composition of claim 1 wherein the graphite contains less than about 0.10 weight percent of the reactive impurities.

3. The composition of claim 1 wherein the polyimide is prepared from pyromellitic dianhydride and 4,4'-oxydianiline.

* * * * *